US012183269B2

(12) United States Patent
Lee et al.

(10) Patent No.: US 12,183,269 B2
(45) Date of Patent: Dec. 31, 2024

(54) PULSE WIDTH MODULATION (PWM) CONTROL APPARATUS AND METHOD FOR IMPROVING DYNAMIC FALSE CONTOUR OF DISPLAY DEVICE

(71) Applicant: SAPIEN SEMICONDUCTORS INC., Seoul (KR)

(72) Inventors: Ji Haeng Lee, Seoul (KR); Jin Woong Jang, Seoul (KR); Ji Han Kim, Seoul (KR); Dae Young Jung, Seoul (KR); Jong Gu Jeon, Seoul (KR); Do Kyung Kim, Seoul (KR)

(73) Assignee: SAPIEN Semiconductors Inc., Gyeonggi-do (KR)

( * ) Notice: Subject to any disclaimer, the term of this patent is extended or adjusted under 35 U.S.C. 154(b) by 0 days.

(21) Appl. No.: 18/448,236

(22) Filed: Aug. 11, 2023

(65) Prior Publication Data

US 2023/0386400 A1 Nov. 30, 2023

Related U.S. Application Data

(63) Continuation of application No. 17/700,611, filed on Mar. 22, 2022, now Pat. No. 11,776,462.

(30) Foreign Application Priority Data

Jun. 25, 2021 (KR) ........................ 10-2021-0083174
Jul. 26, 2021 (KR) ........................ 10-2021-0097558

(51) Int. Cl.
*G09G 3/32* (2016.01)

(52) U.S. Cl.
CPC ........... *G09G 3/32* (2013.01); *G09G 2310/08* (2013.01); *G09G 2370/10* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/3258; G09G 3/3266; G09G 3/3275; G09G 3/3283; G09G 3/3291
USPC ...................................................... 345/76–83
See application file for complete search history.

(56) References Cited

U.S. PATENT DOCUMENTS 11,776,462 B2 * 10/2023 Lee .......................... G09G 3/32 345/204
2003/0063078 A1 4/2003 Hanari et al.
2004/0246215 A1 * 12/2004 Yoo ...................... G09G 3/3688 345/87
2005/0073516 A1 * 4/2005 Kang ....................... G09G 3/22 345/204

(Continued)

FOREIGN PATENT DOCUMENTS

KR 100805609 B1 2/2008
KR 1020160095197 A 8/2016
KR 1020170111788 A 10/2017

*Primary Examiner* — Ke Xiao
*Assistant Examiner* — Nelson Lam
(74) *Attorney, Agent, or Firm* — You & IP, LLC

(57) ABSTRACT

A display apparatus is capable of improving a dynamic false contour. The display apparatus may control to change an order of a plurality of pulses of which widths are modulated for an emission time set within one frame, or divide pulses corresponding to the most significant bit (MSB) and the second significant bit (MSB-1) of image data among the pulses into two or more sub-pulses, and output the sub-pulses.

8 Claims, 5 Drawing Sheets

(56) References Cited

U.S. PATENT DOCUMENTS

| | | | | |
|---|---|---|---|---|
| 2006/0071888 | A1 | 4/2006 | Lee et al. | |
| 2006/0220578 | A1* | 10/2006 | Park | G09G 3/3225 315/169.3 |
| 2007/0097040 | A1* | 5/2007 | Miyazawa | G06K 15/1209 345/77 |
| 2007/0285360 | A1* | 12/2007 | Lee | G09G 3/3233 345/77 |
| 2008/0218450 | A1* | 9/2008 | Park | G09G 3/3233 345/76 |
| 2010/0253666 | A1* | 10/2010 | Yamamoto | H05B 47/10 345/211 |
| 2015/0187252 | A1 | 7/2015 | Ishii et al. | |
| 2015/0302795 | A1 | 10/2015 | Genoe | |
| 2016/0086532 | A1 | 3/2016 | Keum et al. | |
| 2018/0122287 | A1 | 5/2018 | Wen | |
| 2019/0347981 | A1 | 11/2019 | Horowitz et al. | |
| 2022/0189393 | A1* | 6/2022 | Kim | G09G 3/3233 |

* cited by examiner

PULSE WIDTH MODULATION (PWM) CONTROL APPARATUS AND METHOD FOR IMPROVING DYNAMIC FALSE CONTOUR OF DISPLAY DEVICE

CROSS-REFERENCE TO RELATED APPLICATION

This application is a continuation of U.S. application Ser. No. 17/700,611, filed on Mar. 22, 2022, and claims priority to and the benefit of Korean Patent Application Nos. 2021-0083174 filed on Jun. 25, 2021 and 2021-0097558 filed on Jul. 26, 2021, the disclosures of which are incorporated herein by reference in their entirety.

BACKGROUND

1. Field of the Invention

The present disclosure relates to a display apparatus and a method of controlling the display apparatus.

2. Discussion of Related Art

The contents described herein simply provide background information for embodiments described herein and do not necessarily constitute the related art.

An active matrix display maintains a state of emitting light while information of all other pixels is updated. In the case of a digital method associated with a display including a memory in the pixel, data related to light to be output by the pixel is stored for one row with a horizontal frequency (horizontal time), and brightness is controlled by a pulse width modulation (PWM) method. Generally, three or four light emitting elements (for example, light emitting diodes (LEDs)) are included in one pixel, and each light emitting element is referred to as a sub-pixel.

PWM signals for controlling the brightness of the sub-pixels are a combination of signals of which pulse widths are modulated, where the pulse widths of the signals each have a difference by a power of two. Generally, the PWM signals are sequentially input to the sub-pixels so that a signal corresponding to the most significant bit (MSB) of image data is output first and a pulse signal corresponding to the least significant bit (LSB) of the image data is output last. Further, the number of pulse signals (MSB, MSB-1, MSB-2, LSB) is determined according to the number of bits of the image data.

For example, when the image data is 6 bits, a total of 6 pulse signals PWM 5, PWM 4, PWM 3, PWM 2, PWM 1, and PWM 0 may be present. When a gradation is 32, the LED emits light while the pulse signal corresponding to the MSB is input (PWM 5), and the LED does not emit light during the remaining time (PWM 4 to PWM 0). On the other hand, in the case of a gradation 31, the LED does not emit light while the pulse signal corresponding to the MSB is input (PWM 5), and the LED emits light during the remaining time (PWM 4 to PWM 0).

When the sub-pixels corresponding to the gradation 32 and gradation 31 are adjacent to each other, there is a problem in that a difference of light emitting time by the LED compared to the gradations of the two sub-pixels is large, and thus display distortion, which is perceived by a viewer as a gradation corresponding to 0 or 64, rather than an intermediate gradation, occurs. That is, a dynamic false contour can occur.

SUMMARY OF THE INVENTION

The present disclosure is directed to providing a display apparatus capable of improving a dynamic false contour and a method of controlling the same.

The present specification is not limited to the above-mentioned problems, and other problems which are not mentioned will be clearly understood by those skilled in the art from the following disclosure.

One aspect of the present disclosure provides a display apparatus including: a display panel including a plurality of pixel driving circuits; a data driving circuit configured to output signals related to driving of a plurality of light emitting elements included in each pixel driving circuit through a plurality of data lines connected to each pixel driving circuit; a clock driving circuit configured to output a plurality of pulses of which widths are modulated for an emission time set within one frame to the pixel driving circuits through a plurality of clock lines connected to each pixel driving circuit; and a controller configured to output control signals to perform operations of the data driving circuit and the clock driving circuit, wherein the controller includes a data output portion configured to change an order of image data output from the data driving circuit, and a scheduler configured to change an order of the pulses output from the clock driving circuit.

According to one embodiment of the present specification, the data output portion may control the data driving circuit to output bits of the image data in an order from the most significant bit in a first frame group and output bits of the image data in an order from the least significant bit in a second frame group, and the scheduler may control the clock driving circuit to output pulses in an order from a pulse having the longest width in the first frame group and output pulses in an order from a pulse having the shortest width in the second frame group.

According to another embodiment of the present specification, the data output portion may control the data driving circuit so that a pixel driving circuit included in a first group row outputs bits of the image data in an order from the most significant bit in a first frame group and outputs bits of the image data in an order from the least significant bit in a second frame group, and a pixel driving circuit included in a second group row outputs bits of the image data in an order from the least significant bit in the first frame group and outputs bits of the image data in an order from the most significant bit in the second frame group, and the scheduler may control the clock driving circuit so that the pixel driving circuit included in the first group row outputs pulses in an order from a pulse having the longest width in the first frame group and outputs pulses in an order from a pulse having the shortest width in the second frame group, and the pixel driving circuit included in the second group row outputs pulses in an order from a pulse having the shortest width in the first frame group and outputs pulses in an order from a pulse having the longest width in the second frame group.

Another aspect of the present disclosure provides a method of controlling a display apparatus including a data driving circuit configured to output signals related to driving of light emitting elements to pixel driving circuits, a clock driving circuit configured to output pulses of which widths are modulated to the pixel driving circuits, and a controller configured to output control signals to perform operations of the data driving circuit and the clock driving circuit, wherein the controller repeatedly performs (a) controlling the data driving circuit to output bits of the image data in an order from the most significant bit and controlling the clock driving circuit to output pulses in an order from a pulse having the longest width in the case of a first frame group, and (b) controlling the data driving circuit to output bits of the image data in an order from the least significant bit and controlling the clock driving circuit to output pulses in an order from a pulse having the shortest width in the case of a second frame group.

Still another aspect of the present disclosure provides a method of controlling a display apparatus including a data driving circuit configured to output signals related to driving of light emitting elements to pixel driving circuits, a clock driving circuit configured to output pulses of which widths are modulated to the pixel driving circuits, and a controller configured to output control signals to perform operations of the data driving circuit and the clock driving circuit, wherein the controller repeatedly performs (a) controlling the data driving circuit so that a pixel driving circuit included in a first group row outputs bits of the image data in an order from the most significant bit, and a pixel driving circuit included in a second group row outputs bits of the image data in an order from the least significant bit, and controlling the clock driving circuit so that the pixel driving circuit included in the first group row outputs pulses in an order from a pulse having the longest width, and the pixel driving circuit included in the second group row outputs pulses in an order from a pulse having the shortest width in the case of a first frame group, and (b) controlling the data driving circuit so that the pixel driving circuit included in the first group row outputs bits of the image data in an order from the least significant bit, and the pixel driving circuit included in the second group row outputs bits of the image data in an order from the most significant bit, and controlling the clock driving circuit so that the pixel driving circuit included in the first group row outputs pulses in an order from a pulse having the shortest width, and the pixel driving circuit included in the second group row outputs pulses in an order from a pulse having the longest width in the case of a second frame group.

Yet another aspect of the present disclosure provides a display apparatus including: a display panel including a plurality of pixel driving circuits; a data driving circuit configured to output image data related to driving of a plurality of light emitting elements included in each pixel driving circuit through a plurality of data lines connected to each pixel driving circuit; a clock driving circuit configured to output a plurality of pulses of which widths corresponding to the image data are modulated for an emission time set within one frame to the pixel driving circuits through a plurality of clock lines connected to each pixel driving circuit; and a controller configured to output control signals to perform operations of the data driving circuit and the clock driving circuit, wherein the controller controls the clock driving circuit to divide pulses corresponding to the most significant bit (MSB) and the second significant bit (MSB-1) of the image data among the pulses output from the clock driving circuit into two or more sub-pulses and output the sub-pulses.

According to one embodiment of the present specification, the controller may control the clock driving circuit to alternately output the sub-pulse corresponding to the most significant bit (MSB) of the image data and the sub-pulse corresponding to the second significant bit (MSB-1) of the image data.

According to one embodiment of the present specification, the number of sub-pulses corresponding to the most significant bit (MSB) of the image data may be the same as the number of sub-pulses corresponding to the second significant bit (MSB-1) of the image data.

According to another embodiment of the present specification, the number of sub-pulses corresponding to the most significant bit (MSB) of the image data may be one more than the number of sub-pulses corresponding to the second significant bit (MSB-1) of the image data.

In this case, the controller may control the clock driving circuit to output the sub-pulses corresponding to the second significant bit (MSB-1) of the image data between the sub-pulses corresponding to the most significant bit (MSB) of the image data.

Yet another aspect of the present disclosure provides a method of controlling a display apparatus including a data driving circuit configured to output image data related to driving of light emitting elements to pixel driving circuits, a clock driving circuit configured to output pulses of which widths are modulated to the pixel driving circuits, and a controller configured to output control signals to perform operations of the data driving circuit and the clock driving circuit, wherein the controller repeatedly performs (a) dividing pulses corresponding to the most significant bit (MSB) and the second significant bit (MSB-1) of the image data among the pulses output from the clock driving circuit into two or more sub-pulses, and (b) controlling the clock driving circuit to alternately output the sub-pulse corresponding to the most significant bit (MSB) of the image data and the sub-pulse corresponding to the second significant bit (MSB-1) of the image data.

According to one embodiment of the present specification, the operation (a) may be dividing into the same numbers of sub-pulses corresponding to the most significant bit (MSB) of the image data and sub-pulses corresponding to the second significant bit (MSB-1) of the image data.

According to another embodiment of the present specification, the operation (a) may be dividing which results in the number of sub-pulses corresponding to the most significant bit (MSB) of the image data being one more than the number of sub-pulses corresponding to the second significant bit (MSB-1) of the image data.

In this case, the operation (b) may be controlling the clock driving circuit to output the sub-pulses corresponding to the second significant bit (MSB-1) of the image data between the sub-pulses corresponding to the most significant bit (MSB) of the image data.

The method of controlling a display apparatus according to the present specification may be implemented in a form of a computer program recorded in a computer-readable recording medium written to perform the operations of the control method in a computer Other specific details of the present disclosure are included in the detailed descriptions and the drawings.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
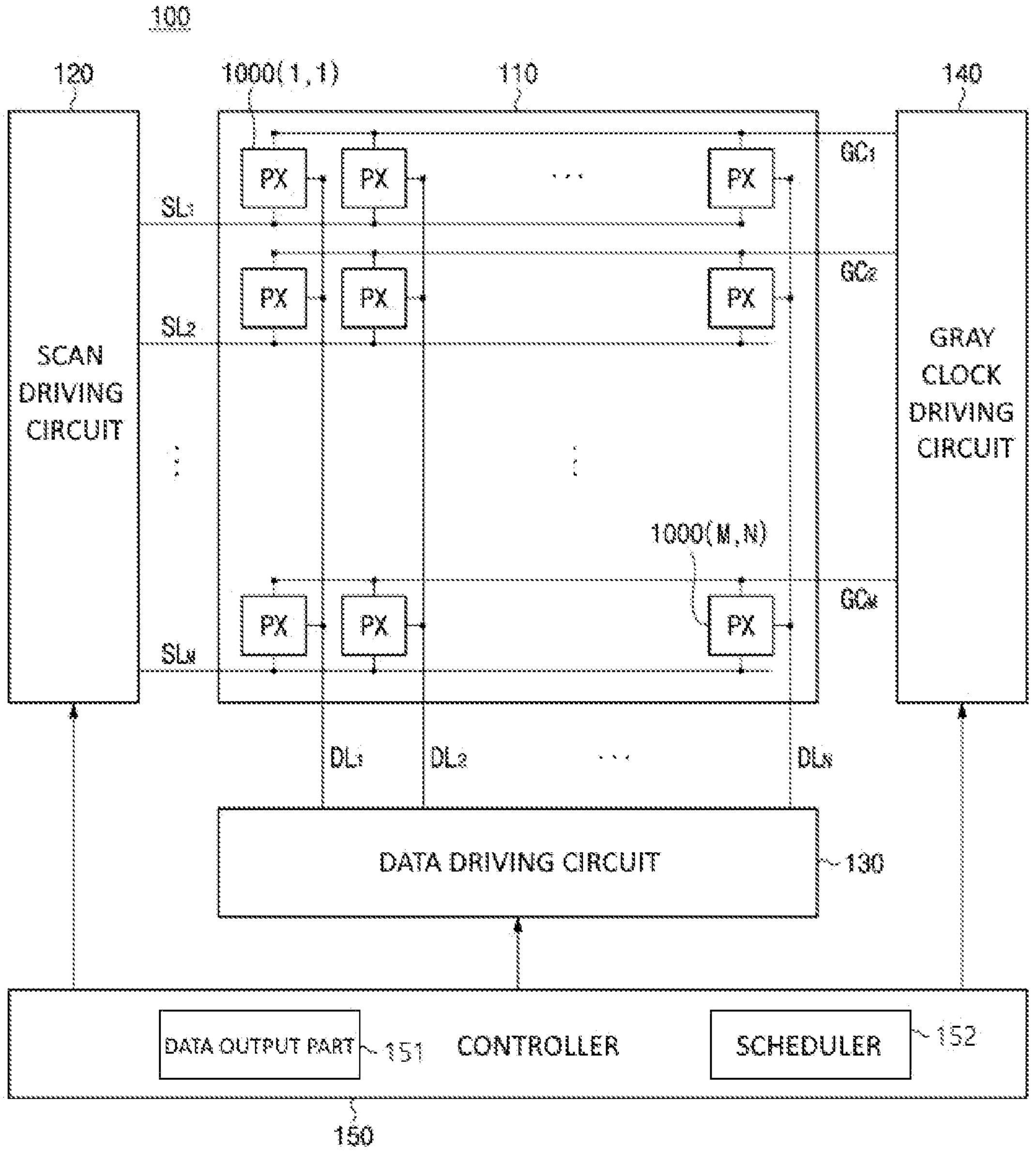
FIG. 1 illustrates a display apparatus including a plurality of pixel circuits according to the present specification.

Advantages and features of the present disclosure which are described in the present specification, and a method of achieving them will be apparent with reference to embodiments which are described later in detail in conjunction with the accompanying drawings. However, the present specification is not limited to the embodiments which will be disclosed later, but may be implemented in various different forms, and only the present embodiments allow the disclosure of the present specification to be complete, and the embodiments are only provided so that the disclosure of the present specification is complete, and to fully inform those of ordinary skill in the art to which this specification belongs (hereinafter, referred to as 'those skilled in the art'), and the scope of the present specification is only defined by the scope of the claims.

Terms used in the present specification are provided not to limit the scope of the present specification but to describe the embodiments. In the present specification, the singular form is intended to also include the plural form unless the context clearly indicates otherwise. The terms 'comprise' and/or 'comprising' as used herein do not preclude the presence or addition of one or more other components other than the above-mentioned components.

The same reference numerals refer to the same or similar components throughout the present specification, and the term "and/or" includes each component and all combinations of one or more of the above-mentioned components. Although "first", "second", and the like are used to describe various components, these components are not limited by these terms. These terms are only used to distinguish one component from another. Accordingly, a first component mentioned below may be a second component within the spirit of the present disclosure.

Unless otherwise defined, all terms (including technical and scientific terms) used in the present specification may be used with meanings which may be commonly understood by those skilled in the art. Further, terms defined in a commonly used dictionary are not to be interpreted ideally or excessively unless otherwise defined.

A case in which one element is indicated as being "connected to" or "coupled to" another element includes both a case in which the one element is directly connected to or coupled to another element and a case in which the one element connected to or coupled to another element with still another element therebetween. On the other hand, the case in which the one element is "directly connected to" or "directly coupled to" another element indicates a case in which there is no other element therebetween.

Hereinafter, embodiments of the present disclosure will be described in detail with reference to the accompanying drawings.

FIG. 1 illustrates a display apparatus including a plurality of pixel circuits according to the present specification.

Referring to FIG. 1, a display apparatus 100 according to the present specification may include a display panel 110, a scan driving circuit 120, a data driving circuit 130, a clock driving circuit 140, and a controller 150.

The display panel 110 may include a plurality of pixels PX according to the present specification. The plurality of pixels PX in a number of M×N (M and N are natural numbers) may be arranged in a matrix form. However, a pattern in which the plurality of pixels are arranged may be arranged in various patterns according to embodiments, such as a zigzag type and the like.

The display panel 110 may be implemented as one of a liquid crystal display (LCD), a light emitting diode (LED) display, an organic LED (OLED) display, an active-matrix OLED (AMOLED) display, an electrochromic display (ECD), a digital mirror device (DMD), an actuated minor device (AMD), a grating light valve (GLV), a plasma display panel (PDP), an electro luminescent display (ELD), and a vacuum fluorescent display (VFD), and may be implemented as other types of flat panel displays or flexible displays. In the present specification, the LED display panel will be described as an example.

Each pixel PX may include a plurality of light emitting elements. The light emitting element may be a light emitting diode (LED). The light emitting diode may be a micro-LED having a size of 80 μm or less. One pixel PX may output various colors through a plurality of light emitting elements having different colors. For example, one pixel PX may include light emitting elements composed of red, green, and blue colors. As another example, when a white light emitting element is able to be further included, the white light emitting element may replace any one of the red, green, and blue light emitting elements. Each light emitting element included in one pixel PX is referred to as a 'sub-pixel.'

Each pixel PX may include a pixel driving circuit which drives a plurality of sub-pixels. In the pixel driving circuit, the sub-pixel may be turned on or off by a signal output from the scan driving circuit 120 and/or the data driving circuit 130. The pixel driving circuit may include at least one thin film transistor, at least one capacitor, and the like. The pixel driving circuit may be implemented in a stacked structure on a semiconductor wafer.

The display panel 110 may include scan lines $SL_1$ to $SL_M$ arranged in a row direction, clock lines $GC_1$ to $GC_M$ arranged in the row direction, and data lines $DL_1$ to $DL_N$ arranged in a column direction. The pixels PX may be located at intersections of the scan lines $SL_1$ to $SL_M$ and the data lines $DL_1$ to $DL_N$. Each pixel PX may be connected to any one scan line SL K and any one data line $DL_K$. The scan lines $SL_1$ to $SL_M$ may be connected to the scan driving circuit 120, the data lines $DL_1$ to $DL_N$ may be connected to the data driving circuit 130, and the clock lines $GC_1$ to $GC_M$ may be connected to the clock driving circuit 140.

The scan driving circuit 120 may drive pixels connected to any one of the scan lines $SL_1$ to $SL_M$. Preferably, the scan driving circuit 120 may sequentially select the scan lines $SL_1$ to $SL_M$. For example, pixels connected to a first scan line $SL_1$ may be driven during a first scan driving period, and pixels connected to a second scan line $SL_2$ may be driven during a second scan driving period. The operation of the scan driving circuit 120 according to the present specification will be described later in more detail.

The data driving circuit 130 may output image data to each pixel through the data lines $DL_1$ to $DL_N$. The image data may be output in a form of a signal related to a gradation to be expressed by the pixels during one frame. Although one data line is connected to a plurality of pixels in a vertical direction, a signal related to the image data may be input only to the pixels connected to the scan line selected by the scan driving circuit 120. The operation of the data driving circuit 130 according to the present specification will be described later in more detail.

The clock driving circuit 140 may output a clock signal to the pixels through the clock lines $GC_1$ to $GC_M$. The clock signal may be formed of a plurality of signals of which pulse widths are modulated (pulse width modulator, PWM), and the number of PWM signals (MSB, MSB-1, MSB-2, . . . , LSB) may be determined according to the number of bits of image data. The clock driving circuit 140 may output the clock signal for an emission time set within one frame.

The controller 150 may output control signals to perform the operations of the scan driving circuit 120, the data driving circuit 130, and the clock driving circuit 140. The controller 150 may output control signals corresponding to image data corresponding to one image frame to the scan driving circuit 120, the data driving circuit 130, and the clock driving circuit 140.

The controller 150 according to the present specification may include a data output portion 151 and a scheduler 152.

The data output portion 151 may change an order of the image data output from the data driving circuit 130. A change in the order of the image data refers to a change in whether to output in an order of [MSB, MSB-1, MSB-2, . . . , LSB+1, and LSB], or in an order of [LSB, LSB+1, LSB+2, . . . , MSB-1, and MSB] when the image data formed of n bits is output.

The scheduler 152 may change an order of the pulses output from the clock driving circuit 140. A change in the order of the pulses refers to a change in whether to output widths of the pulses respectively corresponding to the n bits of the image data in an order of [$2^n$, $2^{n-1}$, $2^{n-2}$, . . . , $2^1$, and $2^0$], or in an order of [$2^0$, $2^1$, $2^2$, . . . $2^{n-1}$ and $2^n$].

According to one embodiment of the present specification, an output order may be changed between frames.

In this case, the data output portion 151 may control the data driving circuit 130 to output the bits of the image data in an order from the most significant bit in a first frame group and output bits of the image data in an order from the least significant bit in a second frame group.

Further, the scheduler 152 may control the clock driving circuit 140 to output the pulses in an order from a pulse having the longest width in the first frame group and output pulses in an order from a pulse having the shortest width in the second frame group.

Figure 2:
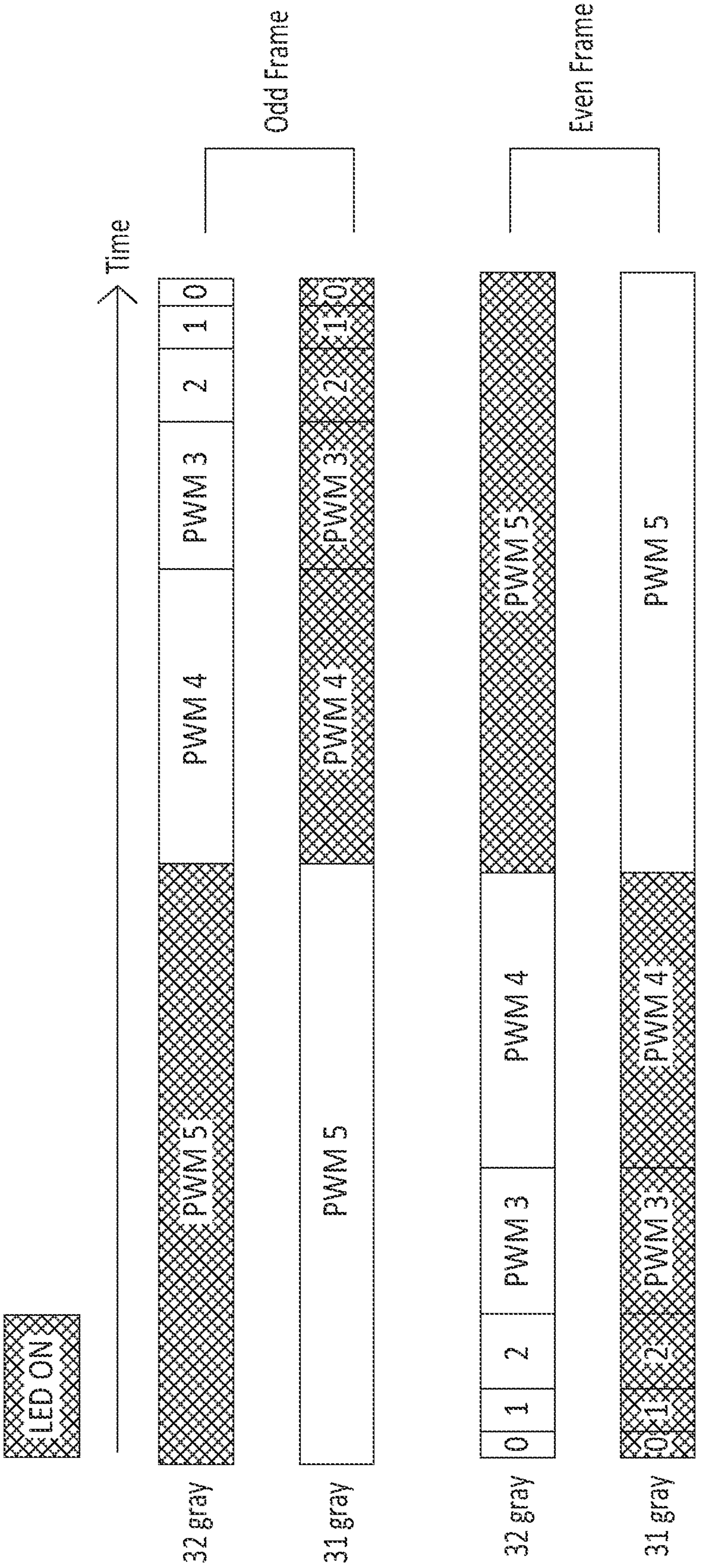
FIG. 2 is an embodiment in which an output order is changed between frames.

FIG. 2 shows an embodiment in which the output order is changed between the frames.

Referring to FIG. 2, when the image data is 6 bits, a PWM signal output order may be checked. In the embodiment shown in FIG. 2, the first frame group is shown as an odd frame, and the second frame group is shown as an even frame. In the odd frame, a signal corresponding to the MSB is output first, and a signal corresponding to the LSB is output last. In the even frame, the signal corresponding to the LSB is output first, and the signal corresponding to the MSB is output last.

According to another embodiment of the present specification, the output order is changed between the frames, and an output order may also be changed between rows in the frame.

In this case, the data output portion 151 may control the data driving circuit 130 so that a pixel driving circuit included in a first group row may output the bits of the image data in the order from the most significant bit in the first frame group and output the bits of the image data in the order from the least significant bit in the second frame group, and a pixel driving circuit included in a second group row may output the bits of the image data in the order from the least significant bit in the first frame group and output the bits of the image data in the order from the most significant bit in the second frame group.

Further, the scheduler 152 may control the clock driving circuit 140 so that the pixel driving circuit included in the first group row may output the pulses in the order from the pulse having the longest width in the first frame group and output the pulses in the order from the pulse having the shortest width in the second frame group, and the pixel driving circuit included in the second group row may output the pulses in the order from the pulse having the shortest width in the first frame group and output the pulses in the order from the pulse having the longest width in the second frame group.

Figure 3:
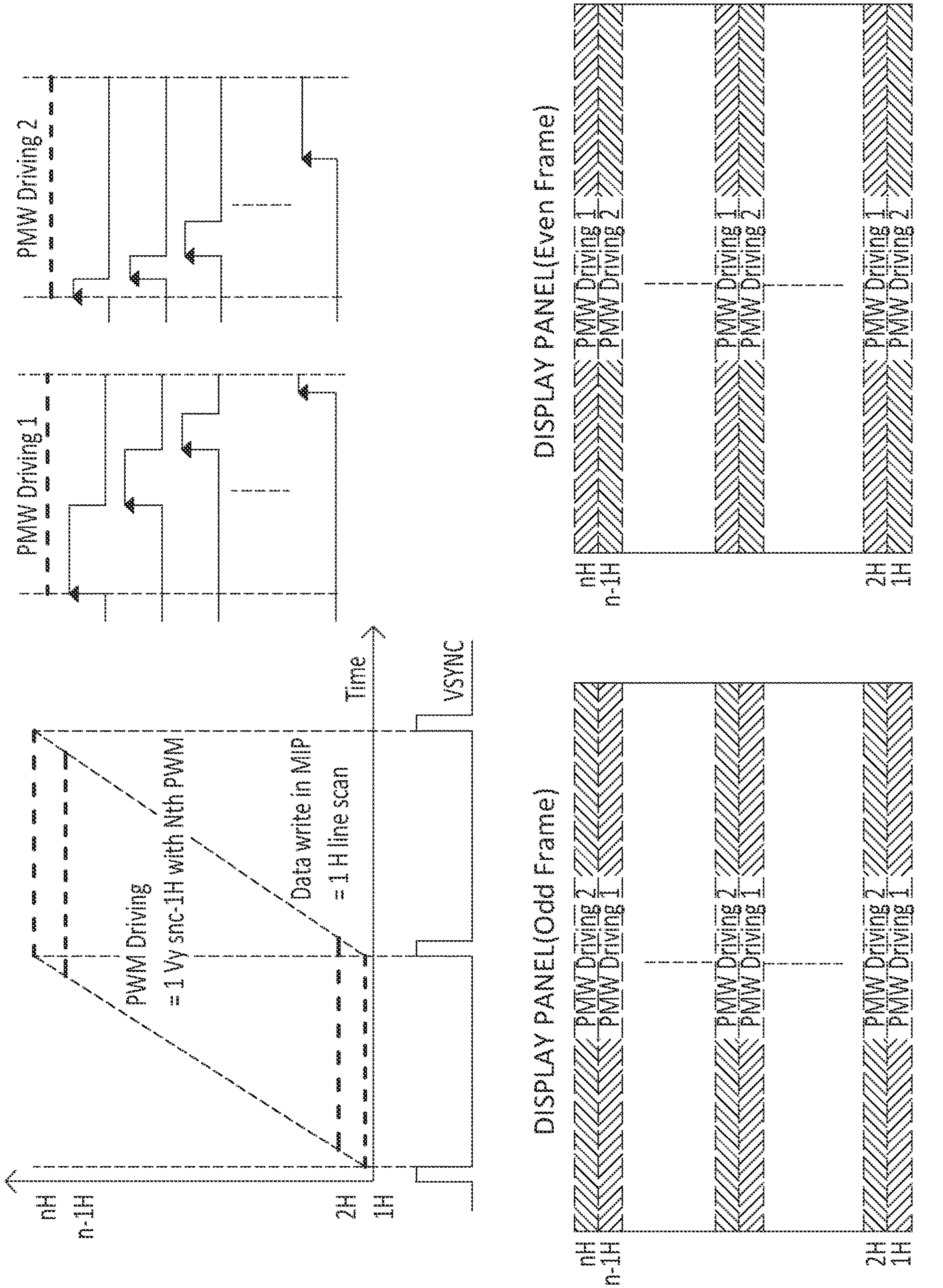
FIG. 3 is an embodiment in which an output order is changed between rows in the frame.

FIG. 3 is an embodiment in which the output order is changed between the rows in the frame.

Referring to FIG. 3, in the odd frame, it can be seen that a signal corresponding to the MSB is output first in an odd row, and a signal corresponding to the LSB is output first in an even row. Further, in the even frame, it can be seen that the signal corresponding to the LSB is output first in an odd row, and the signal corresponding to the MSB is output first in an even row.

Meanwhile, in FIGS. 2 and 3, an example in which a relationship between the first frame group and the second frame group is set as the even frame and the odd frame is presented, but the present specification is not limited thereto. Each of the first frame group and the second frame group may be a group in which frames in the number of two, three, four, or the like are grouped together. Further, although an example in which a relationship between the first group row and the second group row is set as the odd row and the even row is similarly presented, the present specification is not limited to the above-described example. The first group row and the second group row may be a group in which rows in the number of two, three, four, or the like are grouped together.

As described above, average values of differences in emission times of the LEDs in gradations 32 and 31 become the same through control of a change in an output order of the image data and an output order of the corresponding PWM signals. Accordingly, a dynamic false contour due to a time difference between the LED emission times between adjacent gradations may be improved. Meanwhile, although an embodiment in which a size of the image data is 6 bits has been presented for convenience of description, it is apparent that the size of the image data may vary.

The controller 150 according to the present specification may control the clock driving circuit 140 to divide the pulses corresponding to the most significant bit MSB and the second significant bit MSB-1 of the image data among the pulses output from the clock driving circuit 140 into two or more sub-pulses and output the sub-pulses.

Figure 4:
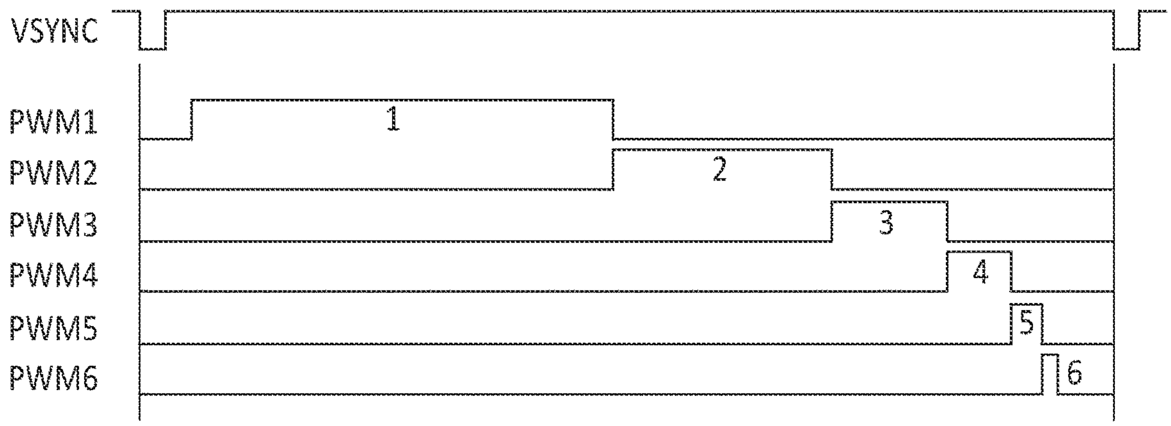
FIG. 4 is an output diagram of a conventional PWM signal.
Figure 5:
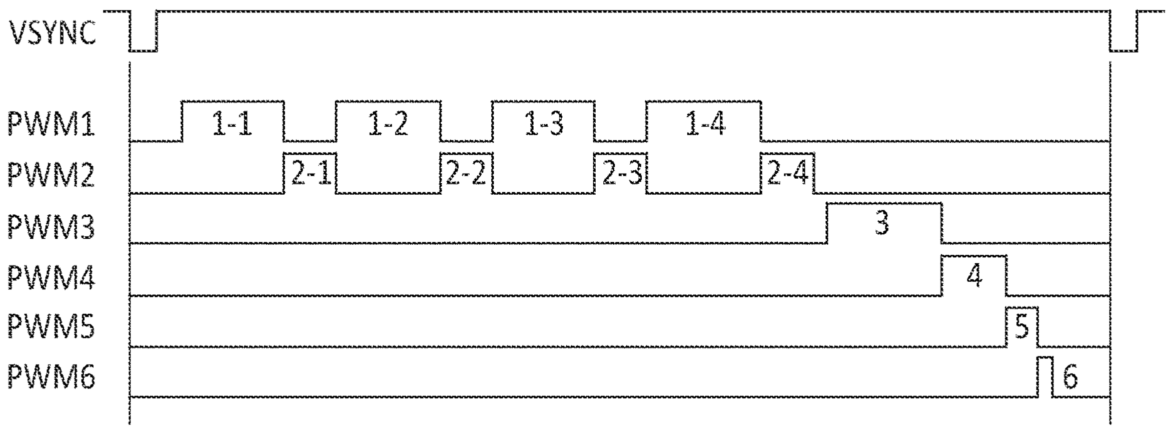
FIG. 5 is an output diagram of a PWM signal according to the present specification.

FIG. 4 is an output diagram of a conventional PWM signal, and FIG. 5 is an output diagram of a PWM signal according to the present specification.

Referring to FIGS. 4 and 5, the PWM signal corresponding to an example in which the image data is 6 bits is shown. However, it should be understood that the display apparatus and the control method according to the present specification are not limited to the above-described examples, and are only examples for convenience of understanding.

In output of a conventional PWM signal, when output of the pulse signal corresponding to the MSB of the image data is completed, output of the pulse signal corresponding to the MSB-1 of the next image data starts, and then one period output is made after outputting the pulse signal corresponding to the MSB-2 of the image data, . . . , the pulse signal corresponding to the LSB of the image data. However, in this case, since the above-described dynamic false contour may occur, in order to improve this, the controller 150 according to the present specification performs control to output the signal by changing a form of the pulse.

Referring to FIG. 5, it can be seen that the pulses corresponding to the most significant bit MSB and the second significant bit MSB-1 of the image data are respectively divided into four sub-pulses (1-1, 1-2, 1-3, and 1-4, and 2-1, 2-2, 2-3, and 2-4). And, in this case, the controller 150 may control the clock driving circuit 140 to alternately output the sub-pulse corresponding to the most significant bit MSB of the image data and the sub-pulse corresponding to the second significant bit MSB-1 of the image data. Like the above, when the pulses corresponding to the most significant bit MSB and the second significant bit MSB-1 of the image data are alternately output through the sub-pulses, since a driving time and a non-driving time of the PWM are uniformly distributed in one frame, the dynamic false contour may be prevented.

Meanwhile, as shown in FIG. 5, the number of sub-pulses corresponding to the most significant bit MSB of the image data may be the same as the number of sub-pulses corresponding to the second significant bit MSB-1 of the image data, but an example in which the number of sub-pulses corresponding to the most significant bit MSB of the image data and the number of sub-pulses corresponding to the second significant bit MSB-1 of the image data are different is also possible. For example, the number of sub-pulses corresponding to the most significant bit MSB of the image data may be one more than the number of sub-pulses corresponding to the second significant bit MSB-1 of the image data. In this case, the controller 150 may control the clock driving circuit 140 to output the sub-pulses corresponding to the second significant bit MSB-1 of the image data between the sub-pulses corresponding to the most significant bit MSB of the image data. For example, when the number of sub-pulses corresponding to the most significant bit MSB of the image data is four (1-1, 1-2, 1-3, and 1-4), and the number of sub-pulses corresponding to the second significant bit MSB-1 of the image data is three (2-1, 2-2, and 2-3), an output order of the sub-pulses may be (1-1, 2-1, 1-2, 2-2, 1-3, 2-3, and 1-4)

Hereinafter, a method of controlling the display apparatus 100 according to the present specification will be described. However, when the method of controlling the display apparatus according to the present specification is described, the above-described repetitive descriptions of the display apparatus 100 will be omitted.

Figure 6:
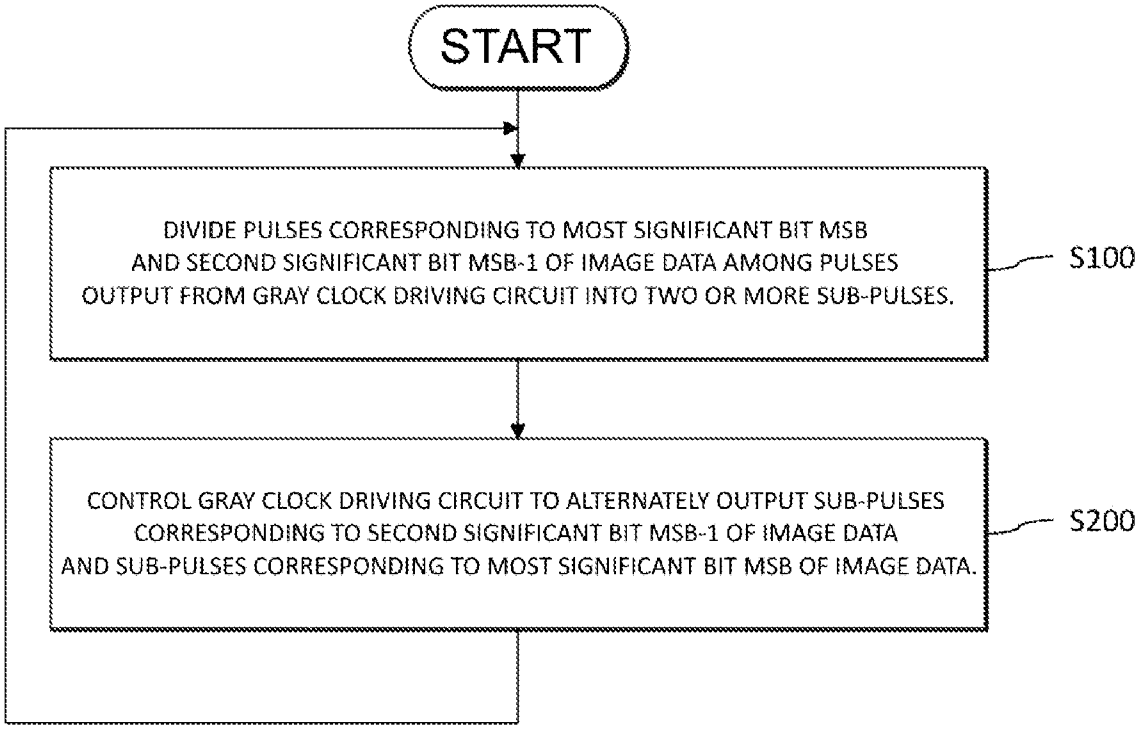
FIG. 6 is a flow chart of a method of controlling a display apparatus according to the present specification.

FIG. 6 is a flow chart of the method of controlling the display apparatus according to the present specification.

Referring to FIG. 6, in an operation S100, the controller 150 may divide pulses corresponding to the most significant bit MSB and the second significant bit MSB-1 of the image data among the pulses output from the clock driving circuit 140 into two or more sub-pulses.

According to one embodiment of the present specification, the operation S100 may be dividing into the same numbers of sub-pulses corresponding to the most significant bit MSB of the image data and sub-pulses corresponding to the second significant bit MSB-1 of the image data.

According to another embodiment of the present specification, the operation S100 may be dividing which results in the number of sub-pulses corresponding to the most significant bit MSB of the image data being one more than or one less than the number of sub-pulses corresponding to the second significant bit MSB-1 of the image data.

In a next operation S200, the controller 150 may control the clock driving circuit 140 to alternately output the sub-pulse corresponding to the most significant bit MSB of the image data and the sub-pulse corresponding to the second significant bit MSB-1 of the image data.

Previously, according to an example in which the number of sub-pulses is different, the operation S200 may be controlling the clock driving circuit 140 to output the sub-pulses corresponding to the second significant bit MSB-1 of the image data between the sub-pulses corresponding to the most significant bit MSB of the image data.

Thereafter, the operations S100 and S200 may be repeatedly performed.

The controller 150 may include a processor, an application-specific integrated circuit (ASIC), another chipset, a logic circuit, a register, a communication modem, a data processing device, and the like known in the technical field to which the present disclosure belongs to execute calculations and various control logics. Further, when the above-described control logic is implemented in software, the controller 150 may be implemented as a set of program modules. In this case, the program modules may be stored in a memory and executed by the processor.

The above-described computer program may include code coded in a computer language such as C/C++, C #, JAVA, Python, a machine language, or the like which may be read by a processor (CPU) of the computer through a device interface of the computer so that the computer reads programs and execute methods implemented as the programs. Such code may include functional code related to a function which defines functions necessary for executing the methods, and the like, and may include control code related to an execution procedure necessary for the processor of the computer to execute the functions according to a predetermined procedure. Further, such code may further include code related to memory reference for which additional information or media necessary for the processor of the computer to execute the above-described functions should be referenced at any location (address) in the computer or an external memory. In addition, when the processor of the computer needs to communicate with any other computer, a server, or the like remotely located to execute the above-described functions, the code may further include code related to communication for communicating with any other computer, the server, or the like which is remotely located using the communication module of the computer, and for transmitting and receiving any information or media during the communication The stored medium does not refer to a medium which stores data for a short moment, such as a register, a cache, a memory, or the like, and refers to a medium which semi-permanently stores data and is readable by a device. Specifically, examples of the stored medium include, a read only memory (ROM), a random access memory (RAM), a CD-ROM, a magnetic tape, a floppy disk, an optical data storage device, and the like, but the present disclosure is not limited thereto. That is, the program may be stored in various recording media on various servers which the computer may access or in various recording media on the user's computer. Further, the medium may be distributed in a computer system connected to a network, and computer-readable code may be stored in the medium in a distributed manner.

According to the present specification, a dynamic false contour can be improved.

Effects of the present disclosure are not limited to the above-mentioned effect, and other effects which are not mentioned will be clearly understood by those skilled in the following disclosure.

In the above, although embodiments of the present specification have been described with reference to the accompanying drawings, those skilled in the art may understand that the present disclosure may be embodied in other specific forms without changing the technical spirit or essential features thereof. Accordingly, it should be understood that the above-described embodiments are exemplary in all respects and not restrictive.

What is claimed is:

1. A display apparatus comprising:

a display panel including a plurality of pixel driving circuits;

a data driving circuit configured to output signals related to driving of a plurality of luminous elements included in each of the plurality of pixel driving circuits through a plurality of data lines connected to each of the plurality of pixel driving circuits;

a clock driving circuit configured to output a plurality of pulses of which widths are modulated for an emission time set within one frame to the plurality of pixel driving circuits through a plurality of clock lines connected to each of the plurality of pixel driving circuits; and a controller configured to output control signals to perform operations of the data driving circuit and the clock driving circuit;

wherein the controller includes a data output circuit and a scheduler, wherein the data output circuit changes an order of image data outputted from the data driving circuit, and wherein the scheduler changes an order of the plurality of pulses outputted from the clock driving circuit, wherein the order of the image data and the order of the plurality of pulses are changed between frames wherein:

the data output circuit controls the data driving circuit to output bits of the image data in an order from a most significant bit in a first frame group and output bits of the image data in an order from a least significant bit in a second frame group; and the scheduler controls the clock driving circuit to output pulses in an order from a pulse having a longest width in the first frame group and output pulses in an order from a pulse having a shortest width in the second frame group.

2. The display apparatus of claim 1, wherein the first frame group includes odd-numbered frames and the second frame group includes even-numbered frames.

3. The display apparatus of claim 1, wherein the image data is output in a form of a signal related to a gradation to be expressed by pixels during one frame.

4. The display apparatus of claim 1, further comprising:

a scan driving circuit configured to sequentially select scan lines connected to each of the plurality of pixel driving circuits.

5. A display apparatus comprising:

a display panel including a plurality of pixel driving circuits;

a data driving circuit configured to output signals related to driving of a plurality of luminous elements included in each of the plurality of pixel driving circuits through a plurality of data lines connected to each of the plurality of pixel driving circuits;

a clock driving circuit configured to output a plurality of pulses of which widths are modulated for an emission time set within one frame to the plurality of pixel driving circuits through a plurality of clock lines connected to each of the plurality of pixel driving circuits; and a controller configured to output control signals to perform operations of the data driving circuit and the clock driving circuit;

wherein the controller includes a data output circuit and a scheduler, wherein the data output circuit changes an order of image data output from the data driving circuit, and wherein the scheduler changes an order of the plurality of pulses outputted from the clock driving circuit, wherein the order of the image data and the order of the plurality of pulses are changed between frames and between rows, wherein:

the data output circuit controls the data driving circuit so that a pixel driving circuit included in a first group row outputs bits of the image data in an order from a most significant bit in a first frame group and outputs bits of the image data in an order from a least significant bit in a second frame group, and a pixel driving circuit included in a second group row outputs bits of the image data in an order from a least significant bit in the first frame group and outputs bits of the image data in an order from a most significant bit in the second frame group; and the scheduler controls the clock driving circuit so that the pixel driving circuit included in the first group row outputs pulses in an order from a pulse having a longest width in the first frame group and outputs pulses in an order from a pulse having a shortest width in the second frame group, and the pixel driving circuit included in the second group row outputs pulses in an order from a pulse having a shortest width in the first frame group and outputs pulses in an order from a pulse having a longest width in the second frame group.

6. The display apparatus of claim 5, wherein the first frame group includes odd-numbered frames and the second frame group includes even-numbered frames, and wherein the first group row includes odd-numbered rows and the second group row includes even-numbered rows.

7. The display apparatus of claim 5, wherein the image data is output in a form of a signal related to a gradation to be expressed by pixels during one frame.

8. The display apparatus of claim 5, further comprising:

a scan driving circuit configured to sequentially select scan lines connected to each of the plurality of pixel driving circuits.

* * * * *